(12) United States Patent
Barbier

(10) Patent No.: US 9,819,288 B2
(45) Date of Patent: Nov. 14, 2017

(54) APPARATUS AND METHOD FOR DETECTING AND PREVENTING MOVEMENT OF A MOTOR IN A DEVICE OF SYSTEM

(71) Applicant: INTEVA PRODUCTS FRANCE SAS, Sully sur Loire (FR)

(72) Inventor: Stéphane Barbier, Saint-Jean-Kerdaniel (FR)

(73) Assignee: INTEVA PRODUCTS FRANCE SAS, Sully sur Loire (FR)

(*) Notice: Subject to any disclaimer, the term of this patent is extended or adjusted under 35 U.S.C. 154(b) by 0 days.

(21) Appl. No.: 15/014,691

(22) Filed: Feb. 3, 2016

(65) Prior Publication Data
US 2016/0233798 A1 Aug. 11, 2016

(30) Foreign Application Priority Data

Feb. 9, 2015 (FR) ...................... 15 51000

(51) Int. Cl.
*F02D 15/00* (2006.01)
*H02K 7/14* (2006.01)
(Continued)

(52) U.S. Cl.
CPC ...... *H02P 3/12* (2013.01); *B60J 1/17* (2013.01); *B60J 7/043* (2013.01); *E05F 15/695* (2015.01);
(Continued)

(58) Field of Classification Search
CPC .................. F04D 15/00; H02K 7/14
(Continued)

(56) References Cited

U.S. PATENT DOCUMENTS 4,591,969 A * 5/1986 Bloom .............. B41J 11/44
318/603
5,483,135 A * 1/1996 Parks .............. B60J 7/0573
318/281
(Continued)

FOREIGN PATENT DOCUMENTS

DE 4307866 A1 4/1994
FR 2902872 A1 12/2007
GB 2097608 A 11/1982

OTHER PUBLICATIONS

English Abstract for DE4307866A1—Apr. 28, 1994; 2 pgs.
(Continued)

*Primary Examiner* — Erick Glass
(74) *Attorney, Agent, or Firm* — Cantor Colburn LLP

(57) ABSTRACT

A motor drive system configured to detect and prevent undesired movement of an item that is configured to be driven by the motor drive system. The motor drive system having: an electronic control unit operatively coupled to a rotor of the motor drive system, the electronic control unit being configured to detect undesired rotation of a shaft of the rotor, wherein the undesired rotation of the shaft is not caused by a force applied by the rotor; and wherein the electronic control unit of the motor drive system is configured to short windings of the motor drive system after a predetermined amount of undesired rotation of the shaft is detected by the electronic control unit such that further rotation of the rotor is prevented.

21 Claims, 6 Drawing Sheets

(51) Int. Cl.
  *H02P 3/12* (2006.01)
  *B60J 1/17* (2006.01)
  *B60J 7/043* (2006.01)
  *E05F 15/695* (2015.01)

(52) U.S. Cl.
  CPC ..... *E05Y 2400/302* (2013.01); *E05Y 2400/51* (2013.01); *E05Y 2400/522* (2013.01); *E05Y 2800/112* (2013.01); *E05Y 2800/424* (2013.01); *E05Y 2800/426* (2013.01)

(58) Field of Classification Search
  USPC .......................................................... 318/3
  See application file for complete search history.

(56) References Cited

U.S. PATENT DOCUMENTS

| | | | |
|---|---|---|---|
| 5,780,988 A * | 7/1998 | Kalb | B60J 7/0573 318/87 |
| 2011/0203748 A1 * | 8/2011 | Mullet | E06B 9/42 160/310 |

OTHER PUBLICATIONS

English Abstract for FR2902872A1—Dec. 28, 2007; 1 pg.
France Preliminary Search Report for Patent Application No. 15/51000, Filed Feb. 9, 2015; Date of Completion: Dec. 11, 2015; 2 pgs.

* cited by examiner

APPARATUS AND METHOD FOR DETECTING AND PREVENTING MOVEMENT OF A MOTOR IN A DEVICE OF SYSTEM

CROSS REFERENCE TO RELATED APPLICATIONS

This application claims foreign priority to French Patent Application No. 15/51000 filed on Feb. 9, 2015 under 35 U.S.C. §119, the entire contents of which are incorporated herein by reference thereto.

BACKGROUND

Various embodiments of the present invention relate to a motor driven system in a vehicle and more particularly, a method and apparatus for preventing undesired movement of the motor driven system.

Some vehicles are provided with motorized windows or sunroofs that move between a closed position and an open position via a motor driven system. When the motor driven system is de-energized and a force is applied to the window or sunroof operatively coupled to the motor and the motor is allowed to be back driven or driven by the applied force, the window or sunroof may be moved from a closed position into at least a partially open position.

Accordingly, it is desirable to provide an apparatus and method for detecting and preventing movement of a motor in a device or system. Typically, the problem is solved by combining the use of relay powered motors and a reduced efficiency of a worm and wheel gear reduction, thus creating the desired degree of drive motor irreversibility. When the motor driven system is de-energized, the relay links motor windings to ground, thus creating a resistive torque that brakes the motor or prevents rotation thereof. The use of relays does not allow controlling the motor speed but only its direction. The demand for speed controlled motion is increasing because it provides a smooth movement and the possibility of reduced speed approaching the travel end, the end user's feedback is positive. Moreover, relays require space and their price is increasing. These drawbacks are solved by an alternative technology called solid-state-relay, which is made of a bridge of MOSFET power transistor. Yet, in the de-energized state, the MOSFET driven motor windings are not short-circuited to ground. The result is that we are losing the contribution of electrical brake effect for irreversibility performance and the problem to be solved is how to recover the desired degree of irreversibility without acting on the second parameter, i.e. decreasing more the efficiency of the worm and wheel gear.

SUMMARY OF THE INVENTION

In one embodiment, a motor drive system is configured to detect and prevent undesired movement of an item that is configured to be driven by the motor drive system. The motor drive system having: an electronic control unit operatively coupled to a rotor of the motor drive system, the electronic control unit being configured to detect undesired rotation of a shaft of the rotor, wherein the undesired rotation of the shaft is not caused by a force applied by the rotor; and wherein the electronic control unit of the motor drive system is configured to short windings of the motor drive system after a predetermined amount of undesired rotation of the shaft is detected by the electronic control unit such that further rotation of the motor is prevented.

In another embodiment, a method of detecting and preventing undesired movement of an item of a motor drive system is provided. The method comprising the steps of: providing an electronic control unit operatively coupled to a rotor of the motor drive system; detecting undesired rotation of a shaft of the rotor; and shorting windings of the rotor after a predetermined amount of undesired rotation of the shaft is detected by the electronic control unit such that further rotation of the rotor is prevented.

BRIEF DESCRIPTION OF THE DRAWINGS

These and/or other features, aspects, and advantages of the present invention will become better understood when the following detailed description is read with reference to the accompanying drawings in which like characters represent like parts throughout the drawings, wherein.

Figure 1:
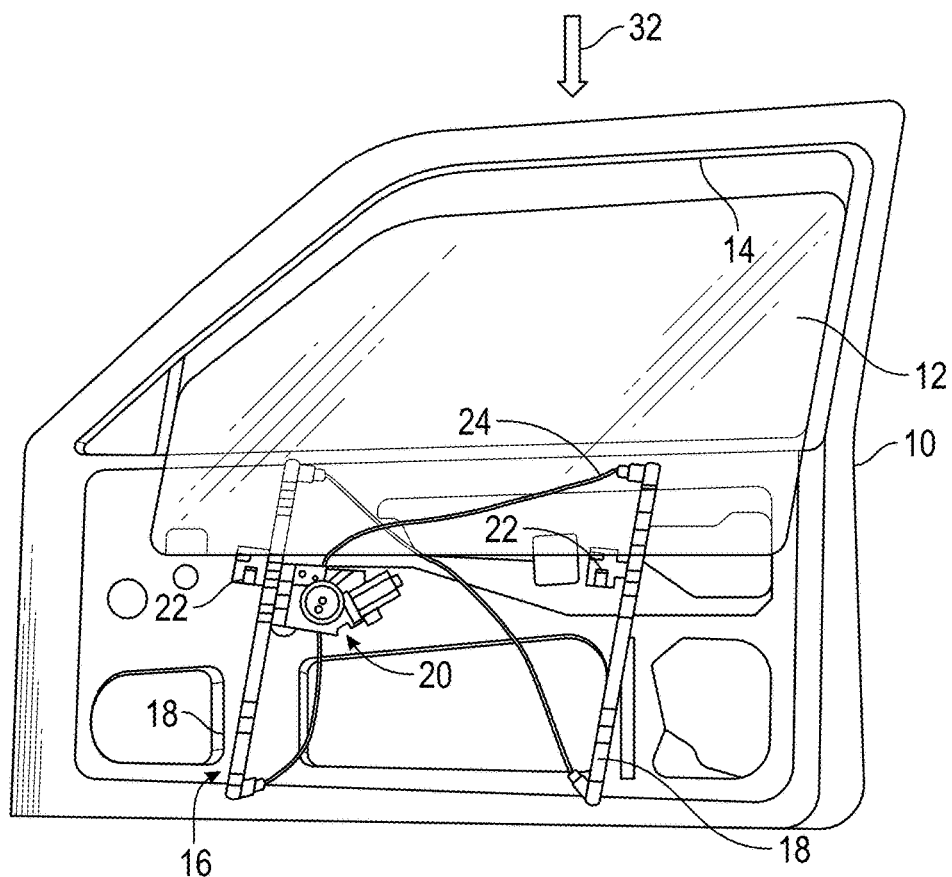
FIG. 1 is a schematic illustration of a door with a motorized window system.

Although the drawings represent varied embodiments and features of the present invention, the drawings are not necessarily to scale and certain features may be exaggerated in order to illustrate and explain exemplary embodiments of the present invention. The exemplification set forth herein illustrates several aspects of the invention, in one form, and such exemplification is not to be construed as limiting the scope of the invention in any manner.

DETAILED DESCRIPTION

Referring now to the FIGS., a vehicle door 10 is illustrated. Door 10 has a window or item 12 movably mounted in an opening 14 of the door 10. The window or item 12 is moved between a closed position and an open position by motor driven closure system. In order to facilitate this movement a window lifter 16 is provided. Window lifter comprises one or a pair of guide rails 18, a motor drive system 20 for moving the window 14 via one or a pair of sliders 22 movably mounted to the guide rails 18. The sliders 22 are operably coupled to a cable 24 that is driven or moved via a motor drive system or electric motor drive system 20 as is known in the related arts.

Figure 2:
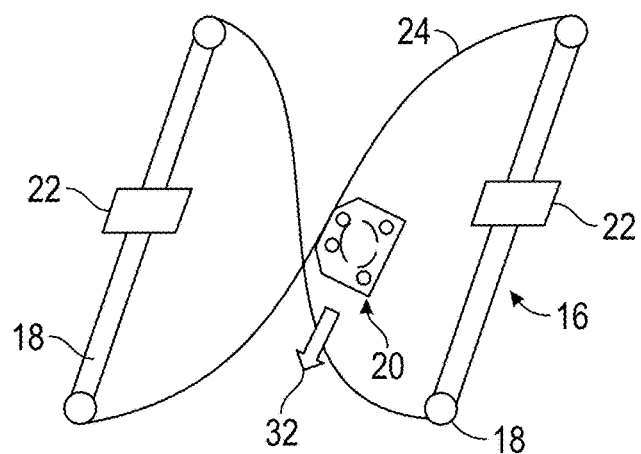
FIG. 2 is a view of a window lifter located in the door of FIG. 1.
Figure 3:
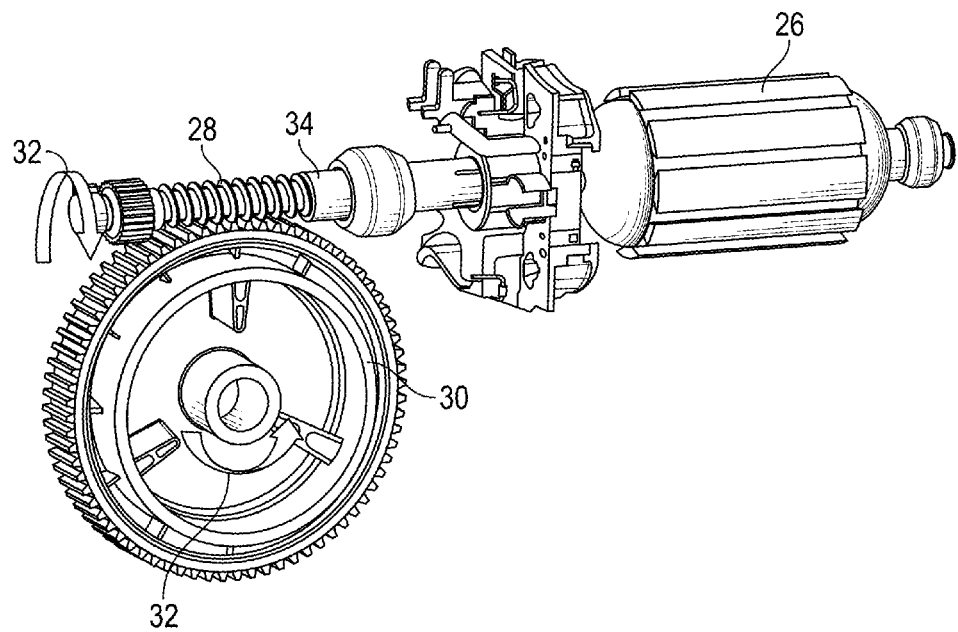
FIG. 3 is an illustration of a motor and a gear of a portion of the motorized window system used in conjunction with the window lifter of FIG. 2.

The motor drive system 20 further comprises a rotor 26 for driving a worm 28 that meshingly engages a gear 30 of a gear train that is configured to rotate a cable drum 31 such that cable 24 can be wound and unwound from the cable drum 31 in order to move the window up and down between the open and the closed positions. In one embodiment, the motor drive system 20 comprises a direct current (DC) motor having brush-fed windings. As shown in FIGS. 1-3, if a force not due to the motor drive system 20 is applied to window 12 in the direction of arrow 32, the force is also applied to window lifter 16 in the direction of arrow 32. This is due to the fact that window 12 is secured to the window lifter 16 via sliders 22. This force in the direction of arrow 32 will ultimately cause a corresponding torque in the direction of arrows 32 (FIG. 3) to also be applied to gear 30 and worm 28 due to the window being operatively coupled to the motor drive system 20.

As mentioned above, if the rotor 26 is de-energized the rotor 26 via worm 28 operatively coupled to a shaft 34 of the rotor 26 can be back driven or rotated due to the force in the direction of arrow 32 being applied to window 12. If this force in the direction of arrows 32 is applied to the window 12 and the rotor 26 is de-energized such that it can be back driven an undesirable amount of movement of window 12 may occur.

In order to prevent this undesired amount of movement of window 12 via the force in the direction of arrow 32 when the motor is de-energized, an apparatus and method for detecting the undesired movement of the motor shaft 34 is provided herein. In addition, the apparatus and method further comprises a means for restricting or preventing the undesired movement of the motor shaft 34 via force applied in the direction of arrows 32 once the movement of the shaft 34 is detected.

Figure 6:
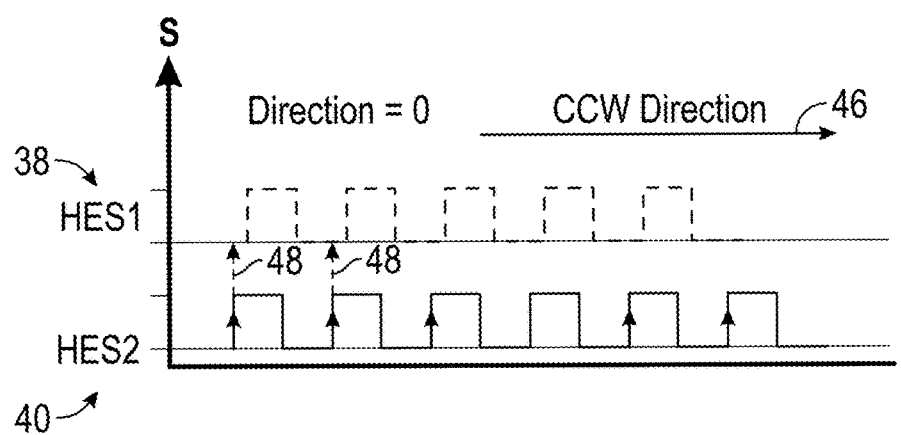
FIG. 6 is a graph illustrating detection of rotation of a motor shaft with one detection system illustrated in FIG. 5.

In some embodiments, the shaft 34 of the rotor 26 has a magnet ring or ring magnet 36 secured thereto. The motor drive system 20 further comprises a pair of hall effect sensors 38, 40 each being positioned to detect one of the north or south pole of the magnet ring 36 as it rotates with shaft 34. Each hall effect sensor 38, 40 is operatively coupled to an electronic control unit (ECU) 42 such that signals of the sensors 38, 40 can be sent to the ECU 42 when the shaft 34 rotates. The state change of the sensors 38 and 40 are illustrated in FIG. 6 due to rotation of magnetic ring 36 in the direction of arrows 44.

In other embodiments, rotation of shaft 34 through 360 degrees of rotation will be sufficient to energize the ECU 42 and enable it to determine that unauthorized rotation of shaft 34 has occurred. In other words, rotation of the shaft 34 causes a motor 33 of the motor drive system 20 to act as a generator due to rotation of the rotor 26 and thus the ECU 42 is powered by the rotation of rotor 26, which in one instance may be undesired rotation. In other embodiments, the ECU 42 may derive its power from alternative sources and the signals received from sensors 38 and 40 are merely used to indicate to the ECU 42 that undesired rotation of rotor 26 has occurred.

It being understood that ECU 42 is operatively coupled to rotor 26 and the ECU 42 is able to short circuit motor windings 35 due to changing an operational state of a MOSFET 43 or equivalent device resident upon the ECU 42 such that rotation of the shaft 34 of rotor 26 is prevented. In other words, short circuiting the motor windings 35 in contact with brushes 37 of the motor via a commutator 39 are brought to the same potential/voltage, which means they are short circuited. In some embodiments, the short circuiting of the motor windings 35 may be achieved by shorting them to ground. In other embodiments, the short circuiting of the motor windings 35 may be achieved by linking the two power brushes together to another electric potential, such as the vehicle battery 45 or any other equivalent device. Still further, the short circuiting of the motor windings 35 may be achieved by simply linking the two power brushes together and not to any other electric potential. The short circuiting of the motor windings 35 to ground or alternatively together to another electric potential or to no electrical potential, creates a resistive torque that prevents further rotation of the rotor 26 of the motor drive system 20. In one embodiment, the rotation of the shaft 34 is prevented due to the motor 33 being energized when the MOSFET 43 is driven to short circuit the motor windings 35. As such and when the motor windings 35 are shorted to ground or are shorted by linking the power brushes of the system together to another electrical potential (e.g., battery 45) or together with out any additional electrical potential, a magnetic field is generating a counter electromotive force that is a linear function of the rotation speed, this means that the faster the rotor 26 turns, the more braking effect is obtained on the rotor.

Since worm 28 meshingly engages gear or gear wheel 30 and the gear ratio is on the order of 1 to 73 a small movement of approximately 1-2 mm of window 12 will result in at least one turn of shaft 34 such that sensors 38 and 40 can detect the movement of window 12 and can prevent further movement of window 12 after a predetermined amount of movement of window 12 is detected by sensors 38 and 40. Once, the predetermined amount of undesired or unauthorized movement is detected the ECU 42 will drive a MOSFET 43 of the motor drive system 20 to short circuit the motor windings 35 to ground or together to another electrical potential or together to no electrical potential such that further rotation of the rotor 26 via shaft 34 is prevented and thus further undesired movement of window 12 will be prevented. Although ratios of 1 to 73 are described above it is understood that ratios greater or less than 1 to 73 are contemplated to be within the scope of various embodiments of the present invention. Similarly, although a movement of 1 to 2 mm of window 12 is discussed ranges of movement greater or less than 1 to 2 mm is also contemplated to be within the scope of various embodiments of the present invention. Still further, although 360 degrees of rotation of shaft 34 is described for the predetermined amount of movement it is understood that greater or less than 360 degrees of rotation is considered to be within the scope of various embodiments of the present invention.

It being understood that ECU 42 may comprise a microprocessor, microcontroller or other equivalent processing device capable of executing commands of computer readable data or program for executing a control algorithm. In order to perform the prescribed functions and desired processing, as well as the computations therefore (e.g., the execution of fourier analysis algorithm(s), algorithm steps, the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces.

In some embodiments it will be understood that the ECU 42 will recognize that the motor 33 is de-energized and detected undesired rotation of the shaft 34 of the rotor 26 by the ECU 42 will cause the ECU 42 to create a resistive torque in the motor drive system 20 such that further rotation of the shaft 34 will be prevented.

FIG. 6 illustrates the state changes of hall effect sensors 38, 40 as they are driven from high (1) to low (0) via rotation of shaft 34 and magnetic ring 36. FIG. 6 illustrates the state changes with counter clockwise CCW rotation of the shaft 34 in direction illustrated by arrow 46. The arrows 48 illustrate 360 degrees of rotation of shaft 34 wherein the state of sensor 40 is driven high, low and back high again. Once, the ECU 42 connected to sensors 38 and 40 has detected at least one revolution of shaft 34 during a de-energized state of the motor 26 the ECU 42 will determine this is an undesired shaft rotation and cause the motor 26 to be shorted so that further rotation of the shaft 34 is prevented. Although, 360 degrees of rotation is illustrated it is, of course, understood that degrees of rotation greater or less than 360 degrees can be used, which in some embodiments may be dependent upon the number of magnetic ring north and south poles as well as the number of hall effect sensors used. Moreover and although only one north and south pole are illustrated on the magnetic ring it is understood that various embodiments of the present invention contemplate a magnetic ring with a plurality of even numbered north and south poles (e.g., 2 north, 2 south, 4 north, 4 south, etc.) or alternatively a magnetic ring with only one north pole and one south pole. As described above, the rotor 26 is shorted by driving or changing a state of at least one MOSFET 43 driven by the ECU 42. In some embodiments, the MOSFET 43 is located on the same printed circuit board 49 as the ECU 42 but can be located anywhere else. In the embodiments wherein the Hall Effect sensors are employed, the power to drive the ECU 42 and/or MOSFET 43 is derived from a battery 45 operatively coupled to the motor drive system 20.

Figure 4:
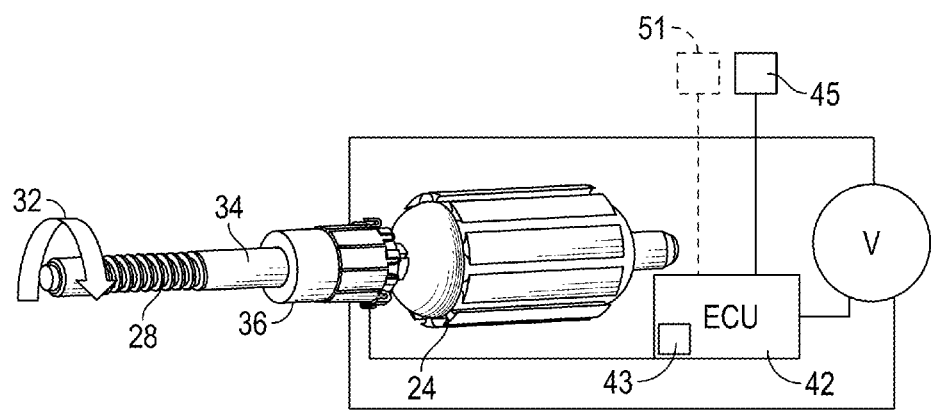
FIG. 4 is an illustration of components of a motor drive system for use with movement detection and prevention systems of various embodiments of the present invention.
Figure 4A:
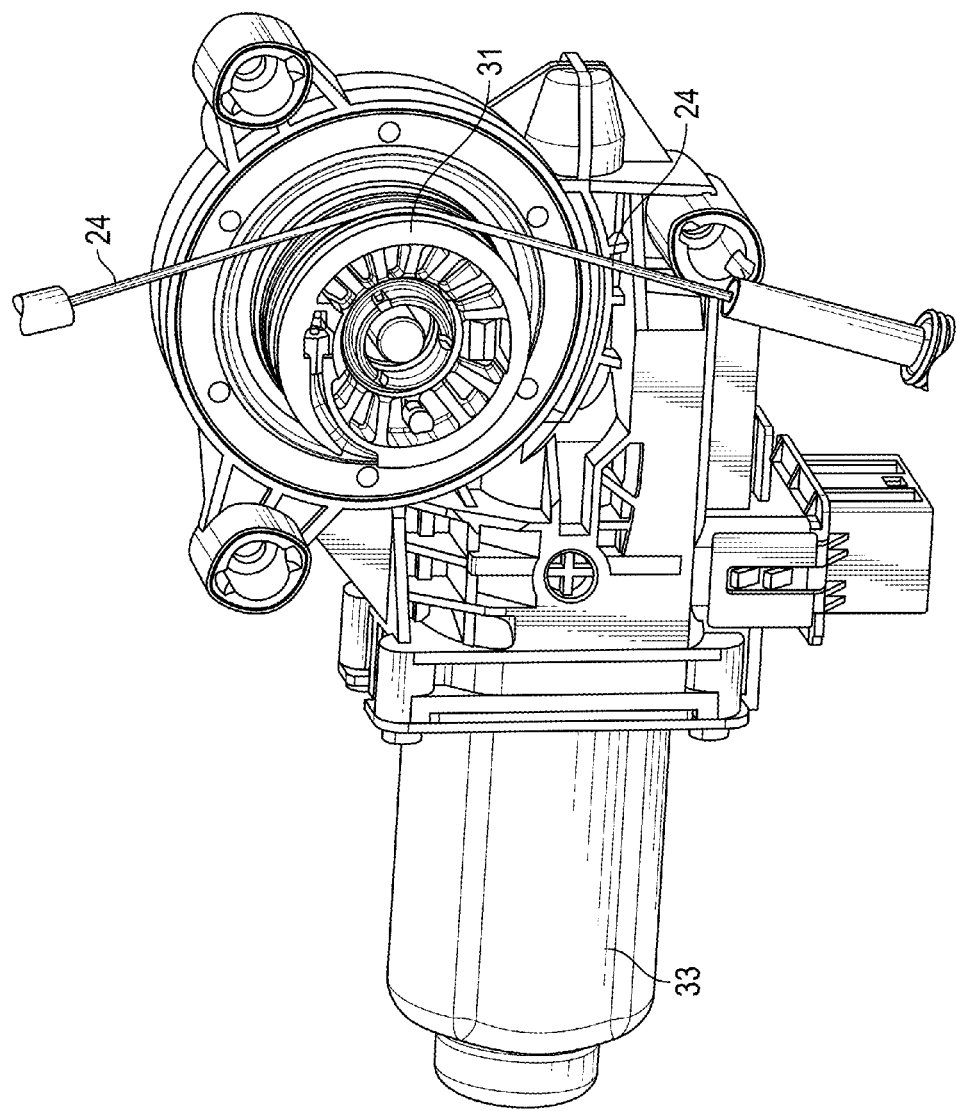
FIG. 4A is an illustration of a motor drive system according to one non-limiting embodiment of the present invention.
Figure 4B:
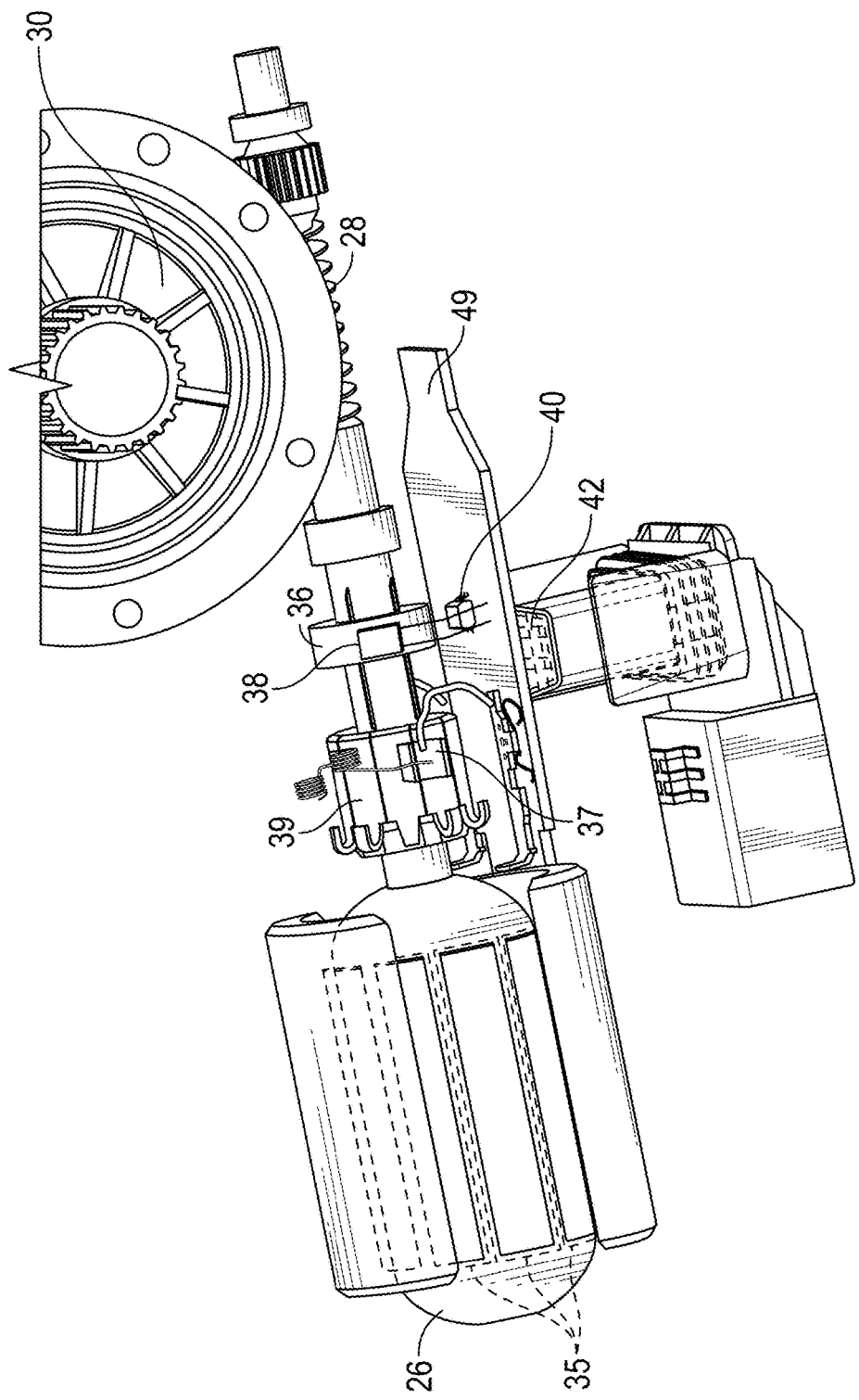
FIG. 4B is a view of the motor drive system of FIG. 4A with a housing portion and cable drum removed.
Figure 5:
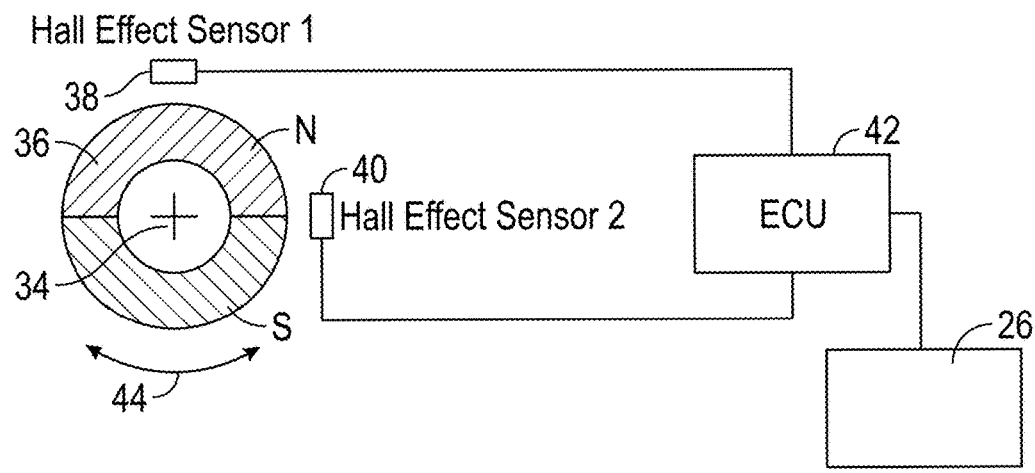
FIG. 5 is an illustration of a detection system of one embodiment of the present invention.
Figure 7:
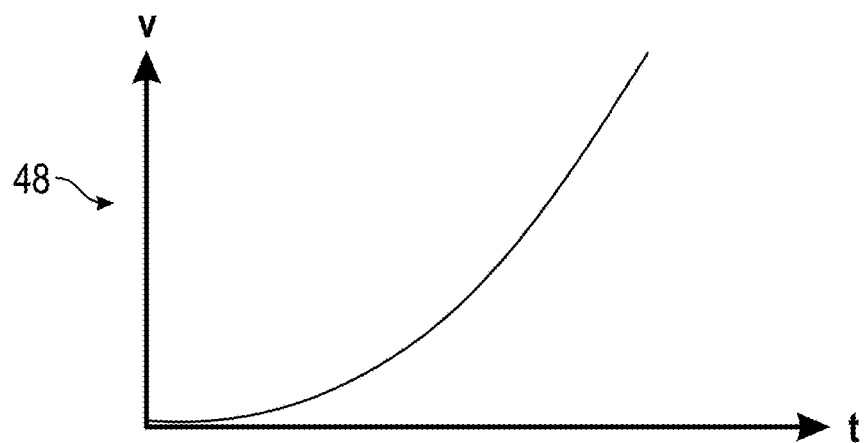
FIG. 7 is a graph illustrating detection of rotation of a motor shaft with another detection system illustrated in FIG. 4.

Referring now to FIGS. 4 and 7 an alternative embodiment of the present invention is illustrated. Here an alternative means for detecting undesired rotation of shaft 34 is provided as well as an alternative means of powering the ECU 42 and driving MOSFET 43. In this embodiment, detection and use of a back electro-motive force is provided. In this embodiment and when the shaft 34 is rotated due to undesired movement of item 12, a generated voltage, due to the rotation of shaft 34 and rotor 26, is detected by the ECU 42. In this embodiment, the generated voltage can also be used to power and/or wake up the ECU 42 as well as directly drive the MOSFET 43 of the ECU 42 either through the ECU 42 or directly from the generated voltage of the motor drive system 20 in order to short circuit the motor windings 35 such that further rotation of the rotor 26 is prevented. In one non-limiting embodiment, the induced voltage due to rotation of the rotor 26 may be stored in a capacitor 51 such that the induced voltage may be stored in the capacitor 51 in order for it to be used to drive the ECU 42 and/or MOSFET 43. Alternatively, this power may be provided by battery 45. Here the generated voltage is caused by rotation of shaft 34 via force in the direction of arrows 32 as discussed above. This rotation will cause rotor 26 to rotate within a stator of the motor drive system 20 and thereby create a voltage as is known in the related arts. For example, the motor drive system 20 works as an electrical generator in response of a mechanical energy input (e.g., an applied force in the direction of arrows 32). As discussed above, a predetermined amount of movement of window 12 will cause a predetermined mount of rotation of shaft 34 in order to generate the induced voltage. Once the induced voltage is generated, the ECU 42 will detect this voltage or current through any type of detection means and the ECU 42 will be programmed to interpret this detected voltage or current as an undesired rotation of shaft 34 and thus drive the MOSFET 43 either directly or indirectly via the induced voltage and short circuit the motor windings 35 to ground or together to another electrical potential or simply together with no additional electrical potential and thus prevent further movement of the window or item 12.

In another embodiment, the motor of the embodiment of FIGS. 4 and 7 may be a ripple motor configured to read current peaks due to rotational positions of the rotor 26 as it is rotated and thus enabling motor drive system 20 to detect undesired rotation of the rotor 26.

FIG. 7 is a graph illustrating the generated voltage over time via rotation of the motor shaft 34 via movement of the window 12.

Figure 8:
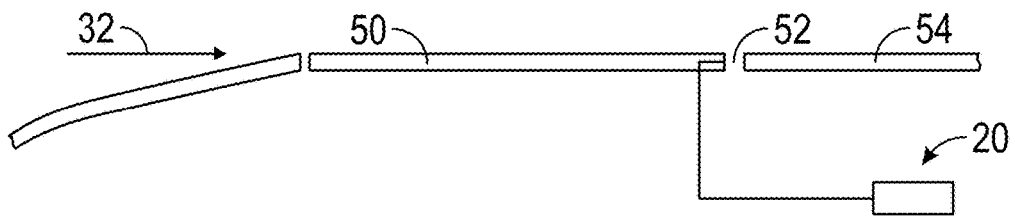
FIG. 8 is a schematic illustration of an alternative embodiment of the present invention.

FIG. 8 is a schematic illustration of an alternative embodiment of the present invention wherein the item being moved between a closed position and an open position is a sliding roof panel, screen or item 50 as opposed to a window 12 and the motor drive system 20 is configured to detect and prevent undesired movement of the sliding roof panel within an opening 52 of a vehicle roof 54. Although a window 12 and roof panel 50 are disclosed as items whose movement is being detected and subsequently prevented it is understood that various embodiments of the present invention may be applicable to any movable component that is driven by a MOSFET 43 powered electric motor drive system. For example, various embodiments of the present invention may also be implemented in any mechanism requiring irreversibility such as any window regulators including but not limited to window regulators as described herein or push-pull cable types, arm and sector types and any other suitable window regulators or any type of sliding roof mechanism.

As used herein, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. In addition, it is noted that the terms "bottom" and "top" are used herein, unless otherwise noted, merely for convenience of description, and are not limited to any one position or spatial orientation.

The modifier "about" used in connection with a quantity is inclusive of the stated value and has the meaning dictated by the context (e.g., includes the degree of error associated with measurement of the particular quantity).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A motor drive system configured to detect and prevent undesired movement of an item that is configured to be driven by the motor drive system, comprising:

an electronic control unit operatively coupled to a rotor of the motor drive system, the electronic control unit being configured to detect undesired rotation of a shaft of the rotor, wherein the undesired rotation of the shaft is not caused by a force applied by the rotor; and wherein the electronic control unit of the motor drive system is configured to short windings of the rotor after a predetermined amount of undesired rotation of the shaft is detected by the electronic control unit such that further rotation of the rotor is prevented.

2. The motor drive system as in claim 1, wherein the motor drive system further comprises a pair of hall effect sensors positioned to detect rotation of a magnetic ring secured to the shaft of the motor.

3. The motor drive system as in claim 2, wherein the magnetic ring comprises only a single north pole and only a single south pole or any even number of north poles and south poles.

4. The motor drive system as in claim 1, wherein the electronic control unit is configured to detect an induced voltage created by the undesired rotation of the shaft of the motor.

5. The motor drive system as in claim 4, wherein the induced voltage is created by rotation of a rotor of the motor drive system within a stator of the motor.

6. The motor drive system as in claim 1, wherein the undesired rotation of the shaft sufficiently energizes the electronic control unit such that it starts operation of identifying undesired rotation and shorting windings of the rotor to ground.

7. The motor drive system as in claim 6, wherein a voltage induced in the windings energizes the electronic control unit.

8. The motor drive system as in claim 1, wherein a signal emitted by a state change of a pair of hall effect sensors is received by the electronic control unit and the signal will cause the electronic control unit to short circuit the windings of the rotor, wherein the pair of hall effect sensors are positioned to detect rotation of a magnetic ring secured to the shaft of the motor.

9. The motor drive system as in claim 1, wherein the electronic control unit drives a MOSFET or any other silicon based switch of the motor drive system to short the windings of the motor drive system to ground after the predetermined amount of undesired rotation of the shaft is detected by the electronic control unit.

10. The motor drive system as in claim 1, wherein the predetermined amount of undesired rotation of the shaft is 360 degrees.

11. The motor drive system as in claim 1, wherein the item is a window located in an opening of a vehicle door.

12. The motor drive system as in claim 1, wherein the item is a sliding roof located in an opening of a vehicle roof.

13. A method of detecting and prevent undesired movement of an item of a motor drive system, comprising:
providing an electronic control unit operatively coupled to a rotor of the motor drive system;
detecting undesired rotation of a shaft of the rotor; and
shorting the windings of the motor drive system after a predetermined amount of undesired rotation of the shaft is detected by the electronic control unit such that further rotation of the rotor is prevented.

14. The method as in claim 13, wherein the motor drive system further comprises a pair of hall effect sensors positioned to detect rotation of a magnetic ring secured to the shaft of the rotor.

15. The method as in claim 14, wherein the magnetic ring comprises only a single north pole and only a single south pole or any even number of north poles and south poles.

16. The method as in claim 13, wherein the electronic control unit is configured to detect an induced voltage created by the undesired rotation of the shaft of the rotor.

17. The method as in claim 16, wherein the induced voltage is created by rotation of the rotor of the motor drive system within a stator of the motor.

18. The method as in claim 13, wherein the electronic control unit drives a MOSFET of the motor drive system to short the windings of the motor drive system to ground after the predetermined amount of undesired rotation of the shaft is detected by the electronic control unit.

19. The method as in claim 13, wherein the predetermined amount of undesired rotation of the shaft is 360 degrees.

20. The method as in claim 13, wherein the item is a window located in an opening of a vehicle door.

21. The method as in claim 13, wherein the item is a sliding roof located in an opening of a vehicle roof.

\* \* \* \* \*